J. H. STONE.
ROTARY REFRIGERATING APPARATUS.
APPLICATION FILED APR. 16, 1913.
1,131,169.  Patented Mar. 9, 1915.
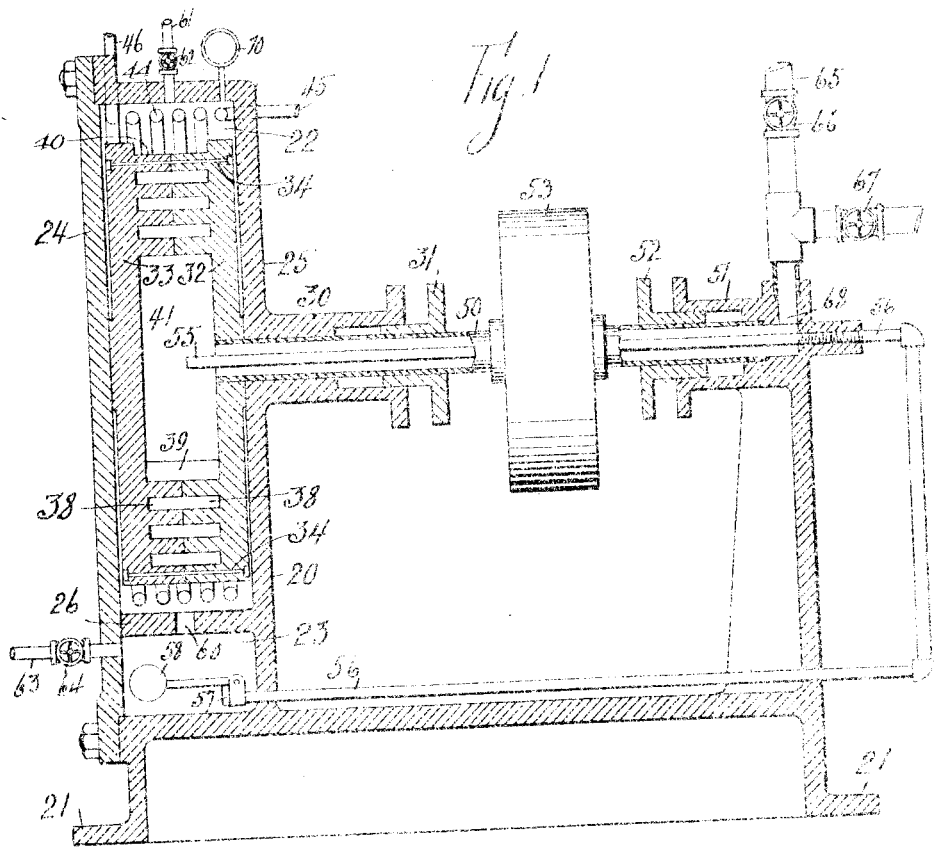
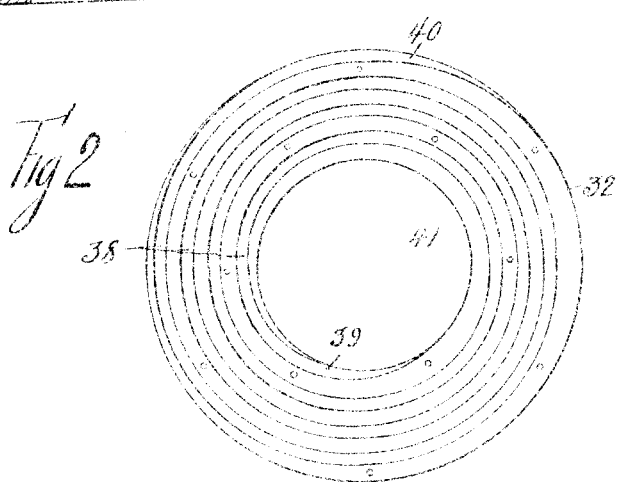
Witnesses:
John J. Miller
Inventor
Junius H. Stone
By his Attorney

UNITED STATES PATENT OFFICE.

JUNIUS H. STONE, OF NOROTON HEIGHTS, CONNECTICUT.

ROTARY REFRIGERATING APPARATUS.

1,131,169. Specification of Letters Patent. Patented Mar. 9, 1915.

Application filed April 13, 1914. Serial No. 831,542.

*To all whom it may concern:*

Be it known that I, JUNIUS H. STONE, a citizen of the United States, and resident of Noroton Heights, in the county of Fairfield and State of Connecticut, have invented certain new and useful Improvements in Rotary Refrigerating Apparatus, of which the following is a specification.

This invention relates to rotary refrigerating apparatus which can be used for refrigeration or ice making. Its operation depends upon the statical pressure of a heavy compressing fluid on a gaseous or vaporized refrigerant, liquefying the latter and which is afterward again vaporized to produce cooling or refrigerating effects. The refrigerant used may be ammonia, sulfurous acid, carbonic acid gas and many other volatile fluids.

In the accompanying drawings Figure 1 represents a partial fragmentary section of a machine exemplifying the invention, Fig. 2 shows a side view of a detail.

A main frame is shown at 20 with the foot flanges 21. The said frame has formed therewith the compression chamber 22 and the regulating valve chamber 23. A removable bonnet 24 is provided for said chambers. The chamber 22 is formed with the rear wall 25 and cylindrical wall 26. From the wall 25 extends a bearing 30 with a stuffing box having the gland 31.

In the compression chamber 22 is located a compressing wheel which is composed of two parts designated by the numerals 32, 33 clamped together by bolts 34. In each of these parts is formed a spiral port 38. The said ports in the two parts registering with each other to form one continuous spiral port. The inlet opening of said port is indicated at 39 and the outlet opening thereof is shown at 40. A central circular cavity 41 in the wheel constitutes what I term a collecting chamber and which connects with the opening 39 of the said spiral groove.

A condensing cooling coil 44 with the inlet end 45 and outlet end 46 is located at the inner periphery of the compression chamber 22.

A shaft conduit 50 extends from the cavity 41 at one end and is supported in a bearing 51 at its other end. A stuffing box with the gland 52 is provided for the bearing 51. A driving pulley 53 is fastened to the shaft conduit 50. An induction pipe 55 is contained within the shaft conduit 50, one end being secured to the bearing 51 and its other end extends into the cavity 41. A conduit 56 has one end axially in line with the pipe 55 and is also secured in the bearing 51. The conduit 56 extends into the regulating valve chamber 23. A regulating valve 57 with the float 58 is located in the chamber 23 and connected with the conduit 56. A port 60 is formed between the chambers 22 and 23. A purging pipe 61 with valve 62 is connected to the chamber 22. An outlet pipe 63 with expansion valve 64 extends from the chamber 23. A gas inlet pipe 65 with stop valve 66 and charging valve 67 extends into a cavity 68 of the bearing 51. The said cavity 68 connects with shaft conduit 50.

To prepare the apparatus for operation the air is pumped out of the same, and is then charged with mercury through the valve 67 until the cavity or collecting chamber 41 is filled to a level of about the lower side of the shaft conduit 50. Next the machine is rotated by a belt not shown on the pulley 53, and the machine is charged with the fluid refrigerant through the said valve 67 until the pressure gage 70 indicates the requisite pressure. The machine is now started by means of the pulley 53. The valves 62, 67 are closed and the valves 66 and 64 are opened. The valves 64 and 66 connect respectively with the inlet end and outlet end of the cooling coil not shown and in which the cooling effect is performed. During the rotations of the compressing wheel in the chamber 22, alternate charges of the mercury and the volatilized refrigerant enter the opening 39 of the spiral port 38, and are discharged therefrom through the outlet opening 40. While the volatile refrigerant is within said spiral it is compressed by the charges or plugs of mercury. When the compressed refrigerant reaches the chamber 22 it is condensed by reason of water circulating through the coil 44. The condensed refrigerant with the compressing fluid gravitates into the chamber 23 through the port 60. The refrigerant then escapes through the valve 64 to be utilized and returns through the pipe 65 to be again compressed. The mercury or compressing fluid is maintained at a sealing level, so that the refrigerant cannot enter the lower leg of the conduit 56, by means of the valve 57 and float 58. In case the mercury should approach the level of the valve 57 the float 58 closes said valve, by floating in the mercury. The mercury during the operation of the machine enters the conduit 56 through the valve 57, and is led into the pipe 55 on its way to the cavity 41. It will be noted that the charges of the refrigerant and plugs of mercury travel through the spiral port 38 by reason of the effects of centrifugal force.

Having described my invention what I desire to secure by Letters Patent and claim is:

1. In a rotary refrigerating apparatus the combination of a compression chamber, a compressing wheel in said chamber, a collecting chamber in said wheel, a spiral port extending from the collecting chamber to the outer periphery of the wheel, means to rotate the wheel, means to circulate charges of compressing fluid from the compression chamber to the collecting chamber, means to charge the collecting chamber with the refrigerant after having been volatilized and means to lead the compressed refrigerant from the compression chamber.

2. In a rotary refrigerating apparatus the combination of a compression chamber, a compressing wheel in said chamber, a collecting chamber within the wheel, a spiral port extending from the collecting chamber lecting chamber within the wheel, a spiral conduit extending into the collecting chamber of the wheel and with one end fastened to the latter, means to turn the shaft conduit, a condensing cooling coil in the compression chamber, a regulating valve chamber connected with the compression chamber, a conduit leading from the regulating valve chamber and extending into the collecting chamber, a gas inlet pipe connected to the said shaft conduit, and outlet piping extending from the regulating valve chamber.

3. In a rotary refrigerating apparatus the combination of a compression chamber, a rotative element therein to compress a volatile refrigerant by means of a compressing fluid, means to lead the compressed refrigerant from the compression chamber, means to lead the volatile refrigerant to the rotative element in the compression chamber and means to circulate the compressing fluid from the compression chamber to the rotative element.

4. In a rotary refrigerating apparatus the combination of a compression chamber, a compressing wheel in the chamber, a collecting chamber in the wheel, a spiral port extending from the collecting chamber to the outer periphery of the wheel, a regulating valve chamber connected by a port to the compression chamber, a shaft conduit journaled in a bearing of the compression chamber and fastened to the compressing wheel, and extending into the chamber of said wheel, an induction pipe in the shaft conduit, a conduit extending from the regulating valve chamber and connecting with the induction pipe, means to rotate the shaft conduit and thereby the compressing wheel, means to lead an expanded refrigerant to the shaft conduit, means to lead the refrigerant after compression from the valve regulating chamber, and a condensing and cooling coil in the compression chamber.

Signed at the borough of Manhattan in the county of New York and State of New York, this seventh day of April A. D. 1913.

JUNIUS H. STONE.

Witnesses:
WALTER C. REID,
ROBERT A. CUMMIN.